(12) United States Patent
Schneider

(10) Patent No.: US 7,723,411 B2
(45) Date of Patent: May 25, 2010

(54) FLAMEPROOF POLYAMIDE MOULDING MATERIALS

(75) Inventor: Ewald Schneider, Fürstenau (CH)

(73) Assignee: EMS-Chemie AG, Domat/EMS (CH)

( * ) Notice: Subject to any disclaimer, the term of this patent is extended or adjusted under 35 U.S.C. 154(b) by 557 days.

(21) Appl. No.: 10/553,259

(22) PCT Filed: Mar. 22, 2004

(86) PCT No.: PCT/EP2004/002992

§ 371 (c)(1),
(2), (4) Date: Jul. 24, 2006

(87) PCT Pub. No.: WO2004/090036

PCT Pub. Date: Oct. 21, 2004

(65) Prior Publication Data

US 2006/0264542 A1    Nov. 23, 2006

(30) Foreign Application Priority Data

Apr. 11, 2003    (DE) .................. 103 16 873

(51) Int. Cl.
*C08K 5/53* (2006.01)

(52) U.S. Cl. .................. 524/133; 524/115; 528/321

(58) Field of Classification Search .............. 524/133, 524/115; 528/321

See application file for complete search history.

(56) References Cited

U.S. PATENT DOCUMENTS

| | | | |
|---|---|---|---|
| 5,071,924 A * | 12/1991 | Koch et al. .............. 525/432 |
| 5,773,556 A * | 6/1998 | Kleiner et al. .............. 528/321 |
| 6,255,371 B1 * | 7/2001 | Schlosser et al. .............. 524/100 |
| 6,270,560 B1 | 8/2001 | Kleiner et al. |
| 6,319,986 B1 * | 11/2001 | Amimoto et al. .............. 525/66 |
| 6,547,992 B1 * | 4/2003 | Schlosser et al. .............. 252/609 |
| 2001/0007888 A1 | 7/2001 | Asano |
| 2003/0018107 A1 | 1/2003 | Heinen et al. |
| 2005/0049339 A1 * | 3/2005 | Knop et al. .............. 524/115 |
| 2005/0101708 A1 * | 5/2005 | Knop et al. .............. 524/115 |
| 2006/0138391 A1 * | 6/2006 | Drewes et al. .............. 252/601 |

FOREIGN PATENT DOCUMENTS

| | | |
|---|---|---|
| DE | 24 47 727 | 4/1976 |
| DE | 199 20 276 A1 | 11/2000 |
| DE | 199 33 901 A1 | 2/2001 |
| EP | 0 299 444 B1 | 1/1989 |
| EP | 0 410 301 B2 | 1/1991 |
| EP | 0 288 269 B1 | 9/1992 |
| EP | 0 699 708 B1 | 3/1996 |
| EP | 0 792 912 B1 | 9/1997 |
| JP | 2001-261973 | 9/2001 |
| WO | WO 94/29367 A1 | 12/1994 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |

OTHER PUBLICATIONS

English Translation of the International Preliminary Report on Patentability for International Patent Application No. PCT/EP2004/002992.

* cited by examiner

*Primary Examiner*—Timothy J. Kugel
*Assistant Examiner*—Atnaf Admasu
(74) *Attorney, Agent, or Firm*—Leydig, Voit & Mayer, Ltd.

(57) ABSTRACT

The invention relates to flameproof polyamide molding compositions, comprising 30-80% by weight of a semi-aromatic, partially crystalline polyamide and 1-30% by weight of a flame retardant containing a phosphinic acid salt and/or a diphosphinic acid salt.

18 Claims, No Drawings

FLAMEPROOF POLYAMIDE MOULDING MATERIALS

CROSS-REFERENCE TO RELATED PATENT APPLICATIONS

This application is the U.S. national phase of international patent application PCT/EP2004/02992, filed on Mar. 22, 2004, and claims priority to German patent application number 103 16 873.7, filed Apr. 11, 2003, all of which are hereby incorporated by reference.

The invention relates to halogen-free, flameproof moulding compositions based on semi-aromatic, partially crystalline polyamides which contain salts of phosphinic acids as flame retardants. Because of their dimensional stability at high temperatures and because of their favourable fire behaviour, these moulding compositions are suitable for producing in particular thin-walled moulded articles for the electrical and electronics industry, such as for example connectors.

Semi-aromatic, partially crystalline polyamides with melting points of at least 280° C. are used extensively for producing moulding compositions which make possible the production of moulded articles, e.g. for the electrical and electronics industry, with excellent dimensional stability at high temperatures and with very good flame-retardant properties. Moulding compositions of this type are demanded for example in the electronics industry for producing components which are mounted on printed circuit boards according to the so-called surface mounting technology, SMT. In this application, these components must withstand temperatures of up to 270° C. for short periods of time without dimensional change. Since very thin-walled components are produced in particular in the electronics industry because of miniaturisation, a flammability classification according to UL94 of V0 at 0.4 mm is required for the moulding compositions used for this application.

Preferably halogen compounds or red phosphorus are used as flame retardant for semi-aromatic, partially crystalline polyamides having sufficient thermal stability at temperatures of above 300° C. as is necessary for the production and processing of moulding compositions of this type. The use of brominated polystyrene as flameproofing agent is known from EP 0 410 301 and EP 0 288 269, that of red phosphorus from EP 0 299 444. Halogen-containing flameproof polyamides are toxicologically unsafe in addition to other disadvantages since they release halogen-containing substances during disposal by incineration. Polyamides, which contain red phosphorus, have an inherent dark colour, which restricts the possibilities for colouration. Furthermore, during production and processing of semi-aromatic polyamides with red phosphorus as retardant, considerable safety precautions are necessary because of the required high temperatures and the formation of toxic phosphine.

For these reasons, flame retardants are proposed which do not have the above-mentioned disadvantages. Thus, the use of calcium and aluminum salts of phosphinic and diphosphinic acids as flame retardants for polyamides is described in EP 0 792 912. Polyamide 6 and polyamide 66 are mentioned as particularly suitable polyamides. Moulding compositions produced therefrom achieve according to UL94 the flammability classification V0 with a test piece thickness of 1.2 mm. An indication of the suitability of phosphinic salts as flame retardants in semi-aromatic polyamides, in particular of the possibility of incorporation in polyamides of this type at temperatures of far above 300° C., is not provided.

DE-A1-24 47 727 describes the use of phosphinic acid salts as flame retardant additive in semi-aromatic polyamides. These semi-aromatic polyamides concern amorphous polyamides with softening ranges of significantly below 300° C., the dimensional stability of which at high temperatures does not fulfill the requirements such as are placed on components for surface mounting technology.

U.S. Pat. No. 6,270,560 protects the combination of inter alia aluminum phosphinates and aluminum phosphonates as flame retardants in polyesters and polyamides. The cited examples verify the effect in polyesters but give no indication of their flame-retardant effect in polyamides.

In WO 99/02606, the combination of metal salts of phosphinic acid with condensation products of melamine as flameproofing agent for polyamides, including therein also semi-aromatic polyamides, is described. According to this document, there is a requirement in semi-aromatic, i.e. high-melting polyamides, for at least 30% by weight of metal salt of the phosphinic acid as flame retardant in order to achieve a classification of V0 according to UL94. High quantities of additive of this type can have a negative effect on the mechanical properties of the moulded articles. The examples reveal that, in glass-fibre reinforced polyamide PA 6 6/6 T/6 I with the combination of zinc phosphinate and melam (i.e. N2-(4,6-diamino-1,3,5-triazin-2-yl)-1,3,5-triazine-2,4,6-triamine), a flammability class of V0 at 1.6 mm is achieved.

US 2001/0007888 A1 claims the use of non-halogen-containing, organic flame retardants, inter alia salts of phosphinic acids, in aromatic polyesters and/or polyamides. The examples show the effect of calcium phosphinate in combination with red phosphorus in polyamide 6, a flammability class of V0 at $1/16$" (approx. 1.6 mm) being determined in the UL94 test, but in no way anticipate the use of salts of phosphinic acids in high-melting semi-aromatic polyamides as flame retardants.

For the polyamide moulding compositions which are described according to the state of the art and equipped to be flame retardant, a flammability class of V0 up to a test piece thickness of not below 1.2 mm is found. Hence the requirement for a flammability class V0 at 0.4 mm, as is set by the electrical and electronics industry for the production of thin-walled moulded articles, is not fulfilled.

Starting herefrom, the object of the present invention is to indicate flameproof polyamide moulding compositions which contain a halogen-free flame retardant and which fulfill the requirement for the flammability class V0 at 0.4 mm test piece thickness.

This object preferably is achieved by the characterizing features of the present invention. Advantageous embodiments and further developments of the solution will be apparent from the description of the invention provided herein.

Surprisingly, it was now found that the use of salts of phosphinic acids as flame retardants in semiaromatic, partially crystalline polyamides with melting points of at least 280° C. provides thermoplastic moulding compositions which achieve a flammability classification according to the UL-94 test (Underwriter Laboratories) of V0 at a thickness of the test piece of 0.4 mm, as a result of which they are suitable for the production of very thin-walled moulded articles, in particular of halogen-free components for electrical and electronic appliances with very good flame resistance. These moulded articles have excellent dimensional stability at high temperatures (HDT/A measured according to ISO 75) and can hence be used without restriction in surface mounting technology. They also fulfill the increased requirements which arise in this technology due to the shift to lead-free solder materials and thereby involved higher process temperatures.

The subject of the invention is hence a flameproof polyamide moulding composition, comprising a) 30-80% by weight of a semi-aromatic, partially crystalline polyamide
b) 1-30% by weight of a flame retardant, containing a phosphinic acid salt of formula (I) and/or a diphosphinic acid salt of formula (II) and/or polymers thereof

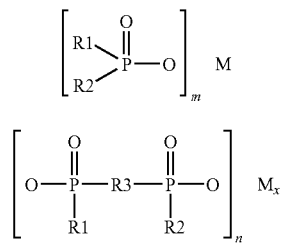

wherein
$R^1$, $R^2$ are the same or different and mean C1-C6 alkyl, linear or branched and/or aryl,
$R^3$ means C1-C10 alkylene, linear or branched, C6-C10 arylene, -alkyl arylene or aryl alkylene;
M means metal ion from the $2^{nd}$ or $3^{rd}$ main or auxiliary group of the periodic table;
m means 2 or 3;
n means 1 or 3;
x means 1 or 2,
c) 5-60% by weight of a fibre- or particle-like filler or mixtures thereof
d) 0.05-10% by weight additives
the sum a) to d) yield 100% by weight.

Either homopolyamides or copolyamides can be used as semi-aromatic, partially crystalline polyamides according to the invention, the repeating units of which are derived from dicarboxylic acids and diamines and also from amino carboxylic acids or respectively the corresponding lactams. Suitable dicarboxylic acids are aromatic and aliphatic dicarboxylic acids, such as for example terephthalic acid, isophthalic acid, adipic acid, azelaic acid, sebacic acid, dodecane dicarboxylic acid and 1,4-cyclohexane dicarboxylic acid. Suitable diamines are aliphatic and cycloaliphatic diamines, such as for example hexamethylene diamine, nonamethylene diamine, decamethylene diamine, dodecamethylene diamine, 2-methylpentamethylene diamine, 1,4-cyclohexane diamine, di-(4-diaminocyclohexyl)-methane, di-(3-methyl-4-aminocyclohexyl)-methane. Suitable amino carboxylic acids are aminocaproic acid and aminolauric acid which can be used also in the form of the corresponding lactams caprolactam and laurolactam.

The melting points of these semi-aromatic polyamides are between 280 and 340° C., preferably between 295 and 325° C.

Particularly preferred are polyamides which are composed of terephthalic acid (TPS), isophthalic acid (IPS) and hexamethyl diamine or from terephthalic acid, adipic acid and hexamethyl diamine. Favourable ratios have proved thereby to be approximately 70:30 TPS:IPS or 55:45 TPS:adipic acid. The superior properties are produced in particular by these two particular polyamides.

The flame redardants according to the invention concern salts of phosphinic acid of formula (I) and/or of diphosphinic acids of formula (II) and/or polymers thereof. Suitable phosphinic acids for the production of the phosphinic acid salts according to the invention are for example dimethylphosphinic acid, ethylmethylphosphinic acid, diethylphosphinic acid, methyl-n-propylphosphinic acid, methane-di(methylphosphinic acid), ethane-1,2-di(methylphosphinic acid), hexane-1,6-di(methylphosphinic acid), benzene-1,4-di(methylphosphinic acid), methylphenylphosphinic acid, diphenylphosphinic acid.

The phosphinic acid salts according to the invention can be produced according to known methods, such as are described for example in EP 0 699 708. The phosphinic acids are thereby reacted in aqueous solution with metal carbonates, metal hydroxides or metal oxides, essentially monomer, possibly—according to the reaction conditions—also polymer phosphinic acid salts being produced.

The phosphinic acid salts according to formulae (I) and (II) can contain ions of metals from the $2^{nd}$ or $3^{rd}$ main or auxiliary group of the periodic table, the calcium- and aluminum salts of the phosphinic acids are preferred. These phosphinic acid salts can also be used in the form of mixtures thereof. They are applied preferably in powder form in order to achieve good dispersion during incorporation into the polymer.

The moulding compositions according to the invention contain as component b) 1-30, preferably 5-25, particularly preferred 8-20% by weight of a phosphinic acid salt of formula (I) and/or a diphosphinic acid salt of formula (II) and/or polymers thereof.

As component c), the moulding compositions according to the invention can contain 5-60% by weight of fibre- or particle-like fillers or mixtures thereof. There may be mentioned as examples of fibre-like fillers, fibrous reinforcing agents, such as glass fibres, carbon fibres, aramide fibres, potassium titanate whiskers, glass fibres being preferred. The incorporation of the glass fibres in the moulding compositions can be effected either in the form of endless strands (rovings) or in cut form (short glass fibres). In order to improve the compatibility with the semi-aromatic polyamides, the glass fibres used may be treated with sizing agents or adhesion promoters. The diameter of the commonly used glass fibre is in the range of 6-20 μm.

Inter alia, glass balls, chalk, powdered quartz, talcum, wollastonite, kaolin, mica are suitable as particle-like fillers.

Common additives as component d) are for example heat stabilizers, antioxidants, UV stabilizers, processing agents, mould-release agents, nucleating agents, pigments, dyes, anti-dripping agents.

The flameproof polyamide moulding compositions according to the invention can be produced according to known methods. For this purpose, the components are mixed in advance and subsequently homogenised in a compounder, e.g. a twin-screw extruder. A common procedure comprises introducing the components a) to d) individually or already mixed via separate dosing units into the compounder. The homogenisation in the polymer melt is effected at temperatures in the range of 290-350° C. depending on the melting point of the semi-aromatic polyamide. The melt is commonly drawn off as a strand, cooled and granulated.

The moulding compositions according to the invention are suitable for producing moulded articles according to the injection moulding process.

The invention relates furthermore to the use of the above-described moulding compositions for producing moulded articles. In the case of the moulding compositions according to the invention, it should be emphasised in particular that these are suitable for producing moulded articles which fulfill the requirement of the UL 94 flammability classification V0 at 0.4 mm test piece thickness. This was also not foreseeable thus from the state of the art since, as is also shown subsequently, it was able to be substantiated by comparative examples that polyamides which do not belong to the selected class of the invention, cannot fulfill this demand. It is therefore particularly preferred if the moulding compositions are used for example in the electrical industry for producing components which are mounted on printed circuit boards according to the so-called surface mounting technology, SMT. In this application, the components must in fact withstand temperatures of up to 270° C. for short periods of time without dimensional change. Components which fulfill this requirement should therefore correspond to the flammability classification according to UL94 of V0 at 0.4 mm.

The following components are used in the examples:

Component a)

polyamide 1: polyamide 6T/66 with a molar ratio of terephthalic acid to adipic acid of 55:45 polyamide 2: polyamide 6T/6I with a molar ratio of terephthalic acid to isophthalic acid of 70:30 polyamide 3: polyamide 66 (comparison)

Component b)

aluminum dimethylphosphinate (produced from dimethylphosphinic acid and aluminum hydroxide)

calcium methylethylphosphinate (produced from methylethylphosphinic acid and calcium oxide)

Component c)

standard glass fibres for polyamides, fibre length 4.5 mm, diameter 10 μm

Component d)

Irganox 1098 (Ciba Specialities)

Calcium stearate

EXAMPLES

The components were compounded, in the quantities cited in Table 1 which are indicated respectively in % by weight, by means of a ZSK30 twin-screw extruder from Werner & Pfleiderer into the corresponding moulding compositions. The components a) and d) were mixed in advance and thus like component b) fed into the feeding zone of the extruder via appropriate dosing equipment. The glass fibres were supplied via a side-feeder. The homogenisation of the components was effected at temperatures of 300-340° C.

The moulding compositions were discharged as a strand, cooled in a water bath and subsequently granulated. The granulate was dried to a moisture content of <0.05% and processed into test pieces on an injection moulding machine. The following tests were performed:

flammability test according to UL-94 on test pieces with a thickness of 0.4 mm after usual conditioning Tensile E-Modulus according to ISO 527, dry as moulded Impact strength at 23° C. according to ISO 179/1eU, dry as moulded Heat deflection temperature, HDT/A, according to ISO 75

TABLE 1

|  | Comparative example | Example 1 | Example 2 |
|---|---|---|---|
| Composition % by weight |  |  |  |
| polyamide 1 |  | 55.4 |  |
| polyamide 2 |  |  | 46.4 |
| polyamide 3 | 55.4 |  |  |
| Al-dimethylphosphinate |  | 14 | 14 |

TABLE 1-continued

|  | Comparative example | Example 1 | Example 2 |
|---|---|---|---|
| Ca-methylethylphosphinate |  |  | 18 |
| Glass fibre | 30 | 30 | 35 |
| Irganox 1098 | 0.25 | 0.25 | 0.25 |
| Ca-stearate | 0.35 | 0.35 | 0.35 |
| Tests |  |  |  |
| Flammability test UL-94 | Classification |  |  |
| 0.4 mm |  | V-0 | V-0 |
| 0.8 mm | V-1 | V-0 | V-0 |
| 1.6 mm | V-0 |  |  |
| Tensile E-Modulus | 10400 | 12200 | 14000 |
| HDT/A MPa °C. | 248 | 287 | 285 |

The invention claimed is:

1. Flameproof polyamide moulding compositions, consisting of:
   a) 30-80% by weight of a semi-aromatic, partially crystalline polyamide
   b) 1-30% by weight of a flame retardant, containing a phosphinic acid salt of formula (I) and/or a diphosphinic acid salt of formula (II) and/or polymers thereof

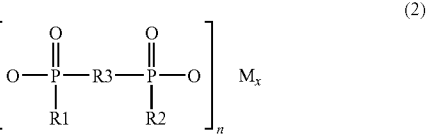

wherein
   R1, R2 are the same or different and mean C1-C6 alkyl, linear or branched and/or aryl,
   R3 means C1-C10 alkylene, linear or branched, C6-C10 arylene, -alkyl arylene or aryl alkylene;
   M means metal ion from the $2^{nd}$ or $3^{rd}$ main or auxiliary group of the periodic table;
   m means 2 or 3;
   n means 1 or 3;
   x means 1 or 2,
   c) 5-60% by weight of a fibre- or particle-like filler or mixtures thereof
   d) 0.05-10% by weight additives
the sum a) to d) yield 100% by weight.

2. Flameproof polyamide moulding compositions according to claim 1, wherein the semi-aromatic polyamide has a melting point of at least 280° C.

3. Flameproof polyamide moulding compositions according to claim 2, wherein the semi-aromatic polyamide has a melting point of at least 295° C.

4. Flameproof polyamide moulding compositions according to claim 1, wherein the semi-aromatic polyamide a) is selected from the group formed by polyamides, the repeating units of which are derived from terephthalic acid, possibly from a further aromatic dicarboxylic acid and/or from one or more aliphatic or cycloaliphatic dicarboxylic acids and also from aliphatic and/or cycloaliphatic diamines and also possibly from aliphatic amino acids.

5. Flameproof polyamide moulding composition according to claim 4, wherein the semi-aromatic polyamide a) is selected from the group formed by polyamides, the repeating units of which are derived from terephthalic acid, adipinic acid and possibly isophthalic acid and also from hexamethylene diamine.

6. Polyamide moulding composition according to claim 1, wherein the polyamide is formed from terephthalic acid (TPS) and isophthalic acid (IPS) and hexamethylene diamine.

7. Polyamide moulding composition according to claim 6, wherein the polyamide contains TPS and IPS in a ratio of approx. 70:30.

8. Polyamide moulding composition according to claim 1, wherein the polyamide is formed from terephthalic acid (TPS) and adipic acid and hexamethylene diamine.

9. Polyamide moulding composition according to claim 8, wherein the polyamide contains TPS and adipic acid in a ratio of approx. 55:45.

10. Flameproof polyamide moulding composition according to claim 1, wherein there is used as flame retardant b) a phosphinic acid salt of formula (I) and/or a diphosphinic acid salt of formula (II) and/or polymers thereof, wherein M stands for calcium or aluminum ions.

11. Flameproof polyamide moulding composition according to claim 1, wherein the phosphinic acid salt used as flame retardant is contained in a quantity of 1-30% by weight relative to the total formulation.

12. Flameproof polyamide moulding composition according to claim 11, wherein the phosphinic acid salt used as flame retardant is contained in a quantity of 5-25% by weight relative to the total formulation.

13. Flameproof polyamide moulding composition according to claim 12, wherein the phosphinic acid salt used as flame retardant is contained in a quantity of 8-20% by weight, relative to the total formulation.

14. Polyamide moulding composition according to claim 1, wherein the additive is selected from stabilizers, processing aids, anti-dripping agents, dyes and/or pigments.

15. Flameproof polyamide moulding composition according to claim 1, wherein the composition fulfills a flammability classification according to UL94 of VO at 0.4 mm.

16. A method of producing moulded articles comprising
    (i) providing a flameproof moulding composition consisting of:
        (a) 30-80% by weight of a semi-aromatic, partially crystalline polyamide,
        (b) 1-30% by weight of a flame retardant, containing a phosphinic acid salt of formula (I) and/or a diphosphinic acid salt of formula (II) and/or polymers thereof

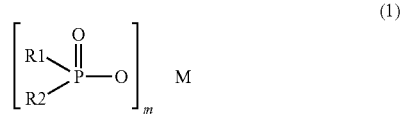

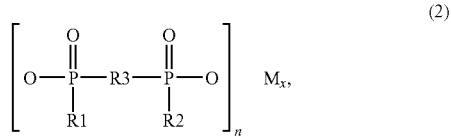

wherein
   R1, R2 are the same or different and mean C1-C6 alkyl, linear or branched and/or aryl,
   R3 means C1-C10 alkylene, linear or branched, C6-C10 arylene, -alkyl arylene or aryl alkylene;
   M means metal ion from the $2^{nd}$ or $3^{rd}$ main or auxiliary group of the periodic table;
   m means 2 or 3;
   n means 1 or 3;
   x means 1 or 2,
   (c) 5-60% by weight of a fibre- or particle-like filler or mixtures thereof, and
   (d) 0.05-10% by weight additives, the sum a) to d) yield 100% by weight, and
  (ii) producing a moulded article from the flameproof moulding composition using an injection moulding process.

17. The method of claim 16, wherein the moulded articles fulfill the requirement according to the UL 94-flammability classification VO found with test pieces with a thickness of 0.4 mm.

18. A moulded article consisting of:
   a) 30-80% by weight of a semi-aromatic, partially crystalline polyamide
   b) 1-30% by weight of a flame retardant, containing a phosphinic acid salt of formula (I) and/or a diphosphinic acid salt of formula (II) and/or polymers thereof

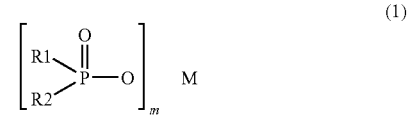

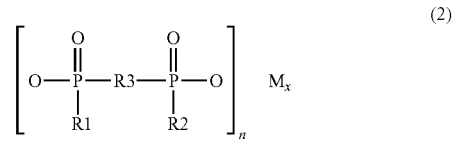

wherein
   R1, R2 are the same or different and mean C1-C6 alkyl, linear or branched and/or aryl,
   R3 means C1-C10 alkylene, linear or branched, C6-C10 arylene, -alkyl arylene or aryl alkylene;
   M means metal ion from the $2^{nd}$ or $3^{rd}$ main or auxiliary group of the periodic table;
   m means 2 or 3;
   n means 1 or 3;
   x means 1 or 2,
   c) 5-60% by weight of a fibre- or particle-like filler or mixtures thereof; and
   d) 0.05-10% by weight additives,
   the sum a) to d) yield 100% by weight,
wherein the moulded article fulfills a flammability classification according to UL94 of VO at 0.4 mm.

* * * * *